UNITED STATES PATENT OFFICE.

ANATOLE ANCELIN, OF PARIS, FRANCE.

METHOD AND MEANS FOR HEATING RAILWAY AND OTHER CARRIAGES.

SPECIFICATION forming part of Letters Patent No. 224,507, dated February 17, 1880.

Application filed December 2, 1879.

*To all whom it may concern:*

Be it known that I, ANATOLE ANCELIN, of Paris, France, have invented a certain Improvement in Heating Railway and other Carriages, which invention is also applicable for other similar purposes, and of which the following is a full, clear, and exact description.

Among the various methods heretofore employed for heating railway-carriages the one found to be most advantageous is that wherein boxes or cases containing hot water are used, for the reason that this method does not require the connection of the separate carriages forming a train. The water which contains the heat effects the warming of the carriages only by virtue of its specific heat—that is to say, by reason of the caloric which is given off in proportion of one unit for each degree of depression of the temperature and for each kilogram of water; but if water is the most useful reservoir of heat in comparison with other bodies, by reason of its great calorific capacity, this advantage no longer exists when such bodies change their condition and pass from a solid to a liquid form.

The method of heating to which this invention relates is based upon the utilization of the latent heat of fusion, and it comprises the liquefying by heat of such solid substances as possess a high degree of latent heat of fusion, so that the said liquefied substances introduced into the objects or places to be warmed give off not only their sensible caloric, but also the latent caloric of fusion.

The said improved method may be employed for railway and other vehicles, for rooms, and for a variety of purposes where heat is required. It may be applied to the keeping up of heat without fire for a long time in cooking apparatus or utensils.

It will, therefore, be seen that this invention consists, essentially, in the novel employment for general heating purposes, and specially for warming railway-carriages, of the heat due to the solidification of substances which were solid and have been liquefied by heat for the purpose.

The substances to be used may be simple or composite bodies, and of either animal, vegetable, or mineral origin.

The following will be found advantageous—that is to say, fatty substances, resin, wax, bituminous and tarry matters, mixtures in which they are combined with other bodies, and their derivatives, such as stearic acid and paraffine, either alone or mixed. I consider as especially valuable for this purpose solutions saturated when hot and those salts which melt in their water of crystallization. Of these salts I prefer acetate of soda, which fuses at a temperature of about 60°. I may also employ those salts which can be submitted to igneous fusion without decomposition, such as the acetates, the phosphates, and the like.

It is to be understood that the bodies or substances which are most suitable for the purposes of this invention are those which are fusible at the temperature that it is desired to give to the boxes or cases when they are in the carriages or other object to be heated. I heat the said boxes or cases containing the acetate of soda or potash or other analogous salt, or one of the substances hereinbefore named, either by plunging them in a hot bath or by placing them in an inclosed space, into which a current of steam is directed. Thus heating will take place without necessitating the emptying of the boxes, whose plugs may even be soldered to prevent all chance of escape.

The boxes containing the liquefied salt or other substance are placed in the cars or carriages in any desired position, as the water-boxes have been heretofore placed. For example, they may be located on the floor of the car or carriage, under the seats, or between them. In size the boxes will vary according to the use; but in general the size should be such as will permit their ready removal and replacement.

The great superiority secured by the said improved method of substituting for water a solid body or substance is proved by the fact that the boxes containing acetate of soda remain warm six times as long as the ordinary boxes with water, and they effect the warming while remaining at a constant temperature during the whole of the time the substances therein are becoming solid.

Having thus fully described my said inven- tion, and the manner in which the same is or may be carried into effect, what I claim, and desire to secure by Letters Patent, is—

1. The method herein described for warming railway-carriages and other vehicles, and for other purposes, which consists in liquefying materials of the class specified, such as the acetates and analogous salts, fatty, resinous, and tarry matters, and the like, inclosed in suitable receptacles, and serving as reservoirs of heat in contradistinction to circulating-conveyers, and effecting the warming required by the heat due to the solidification of such materials, substantially as described.

2. As means for warming railway-carriages and for supplying heat for other purposes by the aid of the latent heat of fusion converted into sensible caloric by the solidification of a liquefied heating medium, the new article described, consisting of the two elements in combination—to wit, first, a warming-box of ordinary or suitable construction, and, second, a medium liquefiable by heat and solidifying at or about the temperature desired to be produced, such as acetate of soda or potash, or analogous salt, resinous, bituminous, or tarry matters, and the like, contained in said box, and adapted to serve as a reservoir of heat in contradistinction to a circulating-conveyer, substantially as described.

In testimony whereof I have signed my name to this specification before two subscribing witnesses.

ANATOLE ANCELIN.

Witnesses:
  GEORGE STOCKWELL,
  MARRUR FONTAINE.